UNITED STATES PATENT OFFICE.

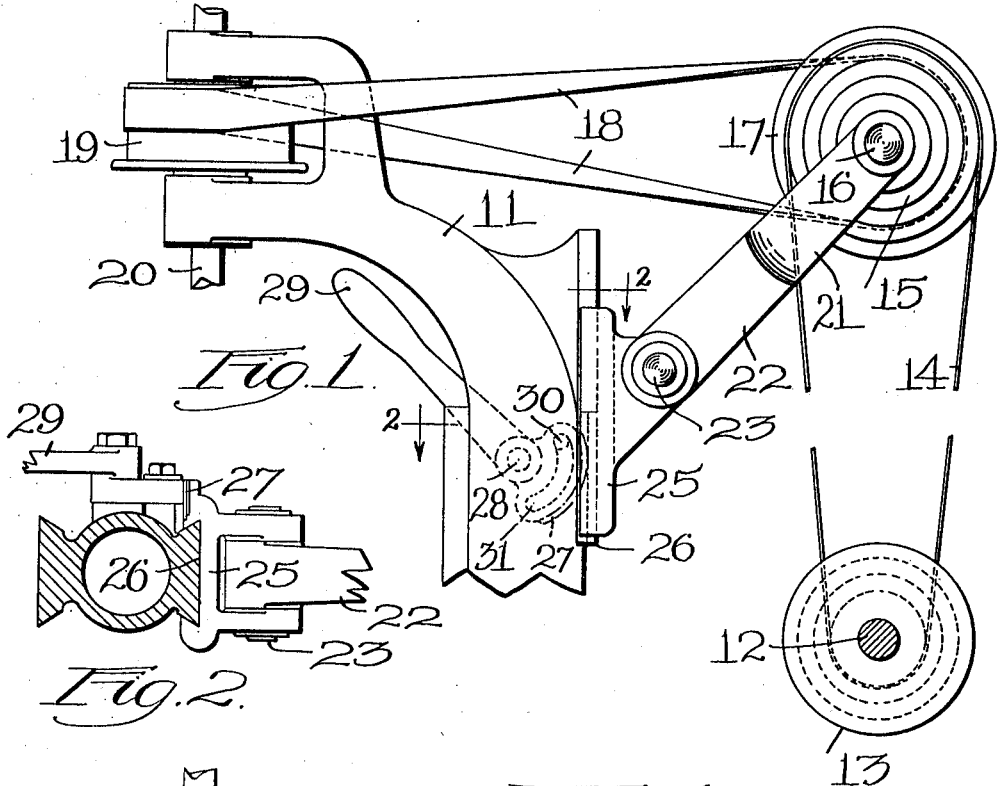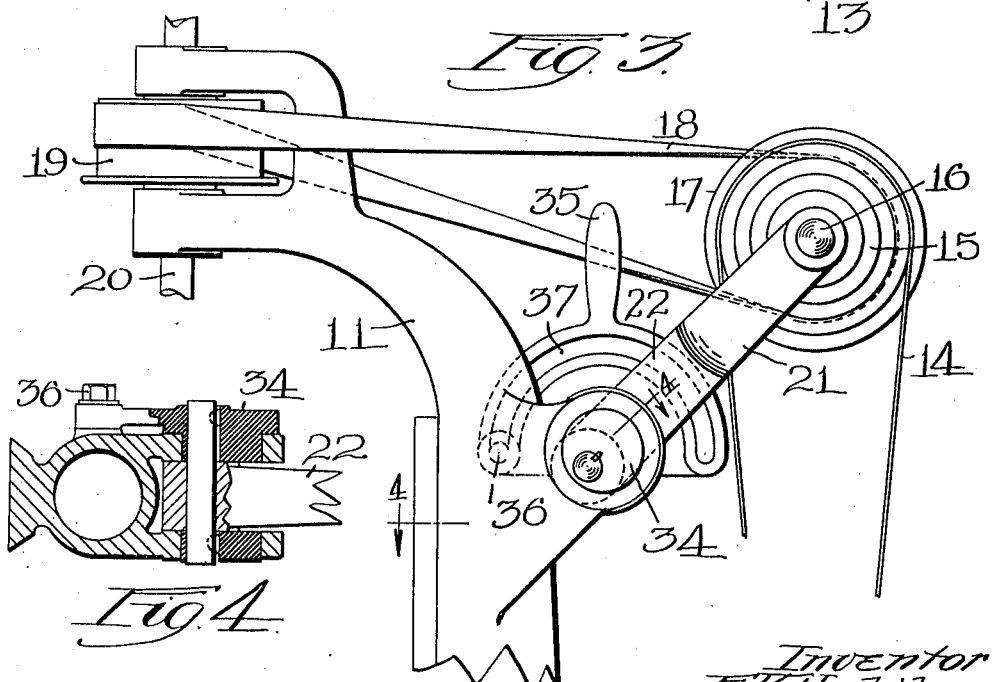

FRED K. HENDRICKSON, OF WORCESTER, MASSACHUSETTS, ASSIGNOR TO PRENTICE BROS. COMPANY, OF WORCESTER, MASSACHUSETTS, A CORPORATION OF MASSACHUSETTS.

BELT-TIGHTENER FOR DRILLS.

1,019,639.  Specification of Letters Patent. Patented Mar. 5, 1912.

Application filed October 20, 1910. Serial No. 588,123.

*To all whom it may concern:*

Be it known that I, FRED K. HENDRICKSON, a citizen of the United States, residing at Worcester, in the county of Worcester and State of Massachusetts, have invented a new and useful Belt-Tightener for Drills, of which the following is a specification.

This invention relates to a sensitive drill, and particularly to that type in which the driving and driven pulleys are connected by two belts extending to two intermediate pulleys, which are bodily movable for adjustment of the belt tensions.

The principal objects of this invention are to provide means for rapidly securing a wide range of adjustment of the intermediate pulleys so that the belt tensions of both belts will be adjustable instantly at any time, whereby the device will be equally efficacious with old and new belts; to provide for an equally quick return; to provide a sensitive construction so that the operator can tell by the "feel" when he has adjusted the belts far enough; and to provide means whereby a single adjustment will suffice to keep both belts at the proper tension, this adjustment preferably being applied to one end of a swinging arm supporting the intermediate pulleys.

Further objects and advantages of the invention will appear hereinafter.

Reference is to be had to the accompanying drawings, in which—

Figure 1 is a front elevation of part of a sensitive drill constructed in accordance with this invention. Fig. 2 is a sectional view thereof on the line 2—2 of Fig. 1. Fig. 3 is a side view of another belt tensioning device coming within the scope of this invention, and Fig. 4 is a sectional view of the same on the line 4—4 of Fig. 3.

In the form of the invention shown in the first two figures, a sensitive drill is illustrated having a goose-neck 11. Extending along the frame near the bottom of the goose-neck is a driving shaft 12 having tight and loose pulleys for receiving power. On the shaft 12 is a cone pulley 13, connected by a belt 14 with a pulley 15 on a shaft 16. Another pulley 17 on the shaft 16 is connected by a belt 18 with a pulley 19 on the drill spindle 20. The shaft 16 is mounted in bearings on a fork 21 forming part of an arm 22 and pivoted at 23 to the back of the goose-neck. This arm is pivoted in such position that it extends between the two belts and in normal position will substantially bisect the angle between them. The arm is freely pivoted so that it is always free to move in either direction. Consequently if for any reason one of the belts is tighter than the other, it will pull the arm over in that direction until the tensions of the two belts are automatically equalized. For this reason the two belts can be tightened, or their tension otherwise regulated, by a single belt tightener.

In the present case the arm 22 instead of being pivoted directly to the goose-neck is pivoted to a rack 25 which is adapted to slide in vertical ways 26 on the back of the goose-neck. To operate the rack a gear segment 27 is provided meshing with it and rocking on a shaft 28 which is provided with a hand-lever 29. The motion of the rack is limited by a fixed pin 30 on the goose-neck and a slot 31 in the segment. With this construction extensive adjustment can be secured because by a simple motion of the lever 29 the pivot of the arm 22 is raised and this arm therefore, without being lengthened, is brought into such position that it directly tends to increase the tension of both belts. Another way in which this object can be accomplished is shown in Figs. 3 and 4. In this case the arm 22 is pivoted on an eccentric 34 which is swung by means of a handle 35 limited by a pin 36 and slot 37 so as to throw the arm outwardly substantially in a longitudinal direction instead of raising it vertically. This also gives a wide range of adjustment and is a very simple construction. In both forms, the adjustment is sensitive; that is, the pull of the belts is communicated directly to the hand of the operator who is adjusting the arm. Therefore there is no danger that an experienced man will tighten the belts more than they will stand. This is an important advantage of this invention, and an equally important one is that the adjustment can be made practically instantaneously so that valuable time will not be lost. The wide range of adjustment is important also. It is particularly so when using new belts, because they stretch so much that a very limited adjustment would reach its limit in a short time.

While I have illustrated and described two preferred embodiments of the invention, I am aware that many modifications can be made therein by any person skilled in the art without departing from the scope of the invention as expressed in the claims. Therefore I do not wish to be limited to all the details of construction herein shown and described, but What I do claim is:—

1. In an upright drill, the combination with a driving pulley on a horizontal axis, a drill spindle on a vertical axis, a driven pulley on the drill spindle, two connected pulleys, a belt extending from the pulley on the horizontal axis to one of the connected pulleys, and a belt extending from the other of the connected pulleys to the pulley on the spindle, of a pivoted arm having bearings for supporting said connected pulleys and mounted so as to be free to swing on its pivot, a hand-lever, a rack to which said arm is pivoted, and a gear segment meshing with said rack and connected with said lever whereby as the hand lever is swung on its pivot the rack will be reciprocated and the position of the pivot of the arm changed.

2. In a drill, the combination of a goose-neck, an arm pivoted on the rear thereof and extending upwardly and outwardly from its pivot, a shaft supported by the outer end of said arm, two pulleys carried by said shaft, a driving pulley near the bottom of the goose-neck, a driven pulley near the top thereof, belts connecting said driving and driven pulleys with the two pulleys on said shaft, said arm being free to swing on its pivot to automatically equalize the belt tensions, a hand-lever mounted on said goose-neck, and means connected with said hand-lever for vertically adjusting the pivot of said arm and tightening the belts, said means comprising a vertically slidable rack to which the arm is pivoted, and a gear segment meshing therewith and connected with said lever.

In testimony whereof I have hereunto set my hand, in the presence of two subscribing witnesses.

FRED K. HENDRICKSON.

Witnesses:
ALBERT E. FAY,
C. FORREST WESSON.

---

Copies of this patent may be obtained for five cents each, by addressing the "Commissioner of Patents, Washington, D. C."